(12) United States Patent
Tom

(10) Patent No.: US 7,370,661 B2
(45) Date of Patent: *May 13, 2008

(54) PERMEABLE GAS ASSEMBLY FOR GAS DELIVERY

(75) Inventor: Glenn M. Tom, Bloomington, MN (US)

(73) Assignee: Advanced Technology Materials, Inc., Danbury, CT (US)

( * ) Notice: Subject to any disclaimer, the term of this patent is extended or adjusted under 35 U.S.C. 154(b) by 179 days.

This patent is subject to a terminal disclaimer.

(21) Appl. No.: 11/214,165

(22) Filed: Aug. 29, 2005

(65) Prior Publication Data

US 2006/0070664 A1    Apr. 6, 2006

Related U.S. Application Data

(63) Continuation-in-part of application No. 10/314,728, filed on Dec. 9, 2002, now Pat. No. 6,935,354.

(51) Int. Cl.
*F16K 47/08* (2006.01)
*G05D 16/02* (2006.01)

(52) U.S. Cl. ............... 137/1; 137/505.39; 137/625.33; 251/127

(58) Field of Classification Search ........... 137/505.39, 137/625.33, 625.49, 1, 39 X, 33 X; 251/117, 251/127, 127 I See application file for complete search history.

(56) References Cited

U.S. PATENT DOCUMENTS

| | | | |
|---|---|---|---|
| 1,645,601 A | 10/1927 | Lee | |
| 2,887,129 A | 5/1959 | Stear | |
| 3,682,437 A | 8/1972 | Miller | |
| 4,397,331 A | 8/1983 | Medlar | |
| 4,398,563 A | 8/1983 | Kay et al. | |
| 4,429,714 A | 2/1984 | Hughes et al. | |
| 4,436,098 A | 3/1984 | Kaufman | |
| 5,518,528 A | 5/1996 | Tom et al. | |

(Continued)

FOREIGN PATENT DOCUMENTS

DE    41 37 137    5/1993

OTHER PUBLICATIONS

Machado, R.M., et al. "Novel Subatmospheric Pressure Gas Sources for Ion Impanters" May 26, 2005, Engineering Research Center (ERC) TeleSeminar, Electronics Technology Department, Air Products and Chemicals, Inc., Allentown, PA 18195.

*Primary Examiner*—Stephen M. Hepperle
(74) *Attorney, Agent, or Firm*—Steven J. Hultquist; Intellectual Property Technology Law; Chih-Sheng Lin

(57) ABSTRACT

A valve assembly for controlling gas delivery from a higher pressure fluid source to a lower pressure processing tool. The valve assembly includes a valve poppet movingly engageable with a valve seating member and a fluid permeable insert positioned between the valve poppet and the valve seating member that is unexposed to flowing fluid when the valve poppet is in a closed position thereby preventing fluid flow through the valve assembly and providing a diffusional path for transfer of all flowing fluid when the valve poppet is in an open position. The permeable insert can be inserted into the sealable and engageable surface of either the valve seat member or the valve poppet.

42 Claims, 6 Drawing Sheets

U.S. PATENT DOCUMENTS

| | | |
|---|---|---|
| 5,628,496 A | 5/1997 | Chamberlin |
| 5,704,965 A | 1/1998 | Tom et al. |
| 5,704,967 A | 1/1998 | Tom et al. |
| 5,707,424 A | 1/1998 | Tom et al. |
| 6,089,027 A * | 7/2000 | Wang et al. .................. 62/46.1 |
| 2004/0107997 A1 | 6/2004 | Tom |
| 2004/0206241 A1 | 10/2004 | Tempel et al. |

* cited by examiner

PERMEABLE GAS ASSEMBLY FOR GAS DELIVERY

CROSS-REFERENCE TO RELATED APPLICATION

This is a continuation-in-part of U.S. patent application Ser. No. 10/314,728 filed Dec. 9, 2002 now U.S. Pat. No. 6,935,354 in the name of Glenn M. Tom for "PERMEABLE GAS ASSEMBLY FOR GAS DELIVERY," now allowed.

BACKGROUND OF INVENTION

1. Field of the Invention

The present invention relates to a gas valve assembly, and more particularly, to a permeable gas valve assembly that controls fluid flow from a fluid source to a processing tool.

2. Description of the Related Art

Many industrial processing and manufacturing applications require the use of highly toxic fluids. The manufacture of semiconductor materials represents one such application wherein the safe storage and handling of highly toxic hydridic or halidic gases becomes necessary. Examples of such gases include silane, germane, ammonia, phosphine, arsine, stibine, hydrogen sulfide, hydrogen selenide, hydrogen telluride, and other halide compounds. As a result of toxicity and safety considerations, these gases must be carefully stored and handled in the industrial process facility. The semiconductor industry in particular relies on the gaseous hydrides of arsine ($AsH_3$) and phosphine ($PH_3$) as sources of arsenic (As) and phosphorus (P) in ion implantation. Ion implantation systems typically use dilute mixtures of $AsH_3$ and $PH_3$ at pressures as high as 1500 psig. Due to their extreme toxicity and high vapor pressure, their use, transportation and storage raise significant safety concerns for the semiconductor industry.

For example, arsine is an extremely toxic gas that is used by the semiconductor industry and typically stored in pressurized containers at about 250 psi. The handling of arsine cylinders in production environments presents a wide variety of hazardous situations. A leak in one 140 gram cylinder of arsine could contaminate the entire volume of a 30,000 square foot building with 10 foot high ceilings to the Immediate Danger to Life and Health (IDLH) level. If the leak were large, such contamination could occur in a few minutes, which would mean that for many hours there would be extremely deadly concentrations in the area near the source of the spill.

Gas pressure regulating valves of the type for delivering gas at a relatively low pressure, have been known and used for many years. However, these valves are subject to leakages of the highly pressurized gas along valve stems. Unless some provision is made for preventing such leakage, the build-up of high pressure gas leakage in trapped volumes within the valve device can introduce an unintended bias into the regulator and produce distortion of the delivery control. In order to nullify the effect of leakage, some pressure regulating valves resort to the use of a constantly open atmospheric vent port for releasing gas leakage directly to the atmosphere. Clearly, in the case of inflammatory gas or explosive gases the possible accumulation of released gas in a confined area becomes a serious health and safety hazard, and an open port is not an option.

In view of the serious potential for injury or death that could result from an unintended release of these fluids, the prior art discloses systems for preventing such catastrophic release of toxic fluids. U.S. Pat. Nos. 5,704,965; 5,704,967; 5,707,424; and 5,518,528 teach systems for storage and dispensing of gases, e.g., hydridic and halidic gases, which operate at ambient temperature by using a pressure reduction to desorb toxic fluids from zeolite, carbon, or other adsorbent materials having high storage (sorptive) capacity for these gases. In these systems, gas is adsorbed and stored on the physical adsorbent in a fluid storage and dispensing vessel and is desorbed from the adsorbent and discharged from the vessel under dispensing conditions. In such systems, the gas can be stored and dispensed at sub-atmospheric pressure levels, typically below about 700 torr. Physical adsorbent-based systems of such type are commercially available from ATMI, Inc. (Danbury, Conn.) under the trademarks SDS and SAGE.

One issue associated with such adsorbent-based fluid storage and dispensing systems relates to the maintenance of high purity of the dispensed gas, since the purity of the gas is reduced if residual absorbent material that is entrained in the discharging gas.

The development of the above-described adsorbent-based fluid storage and dispensing systems has been motivated by safety and reliability issues involving packages of high-pressure gases in the semiconductor industry, as part of efforts in recent years to significantly increase the safety of gas packaging.

Another recent development in the field of enhanced safety fluid storage and dispensing systems is the evolution of systems in which fluid is contained in a vessel having a fluid pressure regulator in the interior volume of the vessel. Such arrangement permits fluid to be stored at high pressures, with the regulator being operative to discharge fluid from the vessel only when it sees a downstream pressure that is below the set point of the regulator. Such internally disposed regulator systems are more fully described in U.S. Pat. Nos. 6,101,816 and 6,089,027, and are commercially available from ATMI, Inc. (Danbury, Conn.) under the trademark VAC.

Despite these developments of safer gas packaging, it remains critical for gas packages to be fabricated without the occurrence of, or potential for, fluid leakage, and to minimize adverse effects that may result from valve mishandling or valve failure in the use of such gas packages.

Accordingly, there is a need in the art for a fluid delivery system that avoids the occurrence of releases of highly pressurized toxic fluid to the ambient environment of the system, or impairment of the purity of the discharged fluid due to the presence of entrained absorbent material therein.

It would therefore be a significant advance in the art to provide a fluid delivery system that reduces the possibility of accidental spillage or release of toxic liquid or gases, eliminates the need for sorbents to control the handling, storage and delivery of toxic fluids, and constrains the flow of fluid during normal operation as well as during any kind of valve mishandling or valve failure.

SUMMARY OF THE INVENTION

The present invention relates to a gas delivery valve device that provides a controlled communication from a fluid source through the valve device to the processing tool.

In one aspect, the present invention relates to a fluid supply apparatus including a fluid source and a permeable fluid valve assembly for delivery of a fluid from the fluid source to a downstream processing tool, wherein the permeable valve assembly includes:

an inlet port for communication with an outlet of a fluid source for flowing fluid from the fluid source; and a permeable valve device positioned downstream from the fluid source comprising a valve member and a permeable valve seat member, wherein:
the valve device is adapted for movement between a sealing position that blocks fluid flow through the inlet port and an open position that permits fluid flow through the inlet port and valve device,
the valve member has a first end and a second end and the first end is positioned in the inlet port,
the valve seat member has an abutting first end having an outflow bore therethrough for acceptance of an extension attached to at least a section of the second end of the valve member,
the abutting first end of the valve seat member comprises an insert that is conformingly configured for engagement with the second end of the valve member and fabricated of a fluid permeable material for transference of the fluid from the fluid source through the inlet port and the permeable section of the valve seat member to the downstream processing tool when the valve device is in the open position, and
the fluid source comprises at least one of (i) a fluid storage and dispensing vessel holding a storage medium for said fluid, and (ii) a fluid storage and dispensing vessel having a pressure actuated fluid flow control assembly interiorly disposed therein.

In another aspect, the invention relates to a semiconductor manufacturing facility including a fluid supply apparatus as described above, and a semiconductor manufacturing tool.

A further aspect of the invention relates to a fluid supply apparatus including a higher pressure fluid source and a permeable valve assembly for controlling gas delivery from the higher pressure fluid source to a lower pressure processing tool, such permeable valve assembly comprising:

an inlet port for connection to an outlet of the fluid source for flowing fluid from the fluid source;
a valve poppet movingly engageable with a valve seating member, wherein the valve poppet has a first end and a second end and the first end is positioned in the inlet port; and
a fluid permeable insert positioned between the second end of the valve poppet and the valve seating member, wherein:
the fluid permeable insert is isolated from flowing fluid when the valve poppet is sealingly engaged with the valve seating member thereby preventing fluid flow through the valve assembly,
the fluid permeable insert provides a diffusional path for transfer of all flowing fluid from the higher pressure fluid source when the valve poppet is not sealingly engaged with the valve seating member, the permeable insert can be inserted into the sealable and engageable surface of either the valve seat member or the second end of the valve poppet, and
the higher pressure fluid source includes at least one of (i) a fluid storage and dispensing vessel holding a storage medium for the fluid, and (ii) a fluid storage and dispensing vessel having a pressure actuated fluid flow control assembly interiorly disposed therein.

Yet another aspect of the invention relates to a fluid supply apparatus including a fluid source and a permeable fluid valve assembly for delivery of a fluid from the fluid source to a downstream processing tool, said permeable fluid valve assembly comprising;

an inlet port for communication with an outlet of a fluid source for flowing fluid from the fluid source; and
a valve device positioned downstream from the fluid source comprising a valve member and a valve seat member, wherein:
the valve device is adapted for movement between a sealing position that blocks fluid flow through the inlet port and an open position that permits fluid flow through the inlet port and valve device,
the valve member has a first end and a second end, wherein the first end is positioned in the inlet port,
the valve seat member has an abutting first end having a bore therethrough for acceptance of an extension attached to at least a section of the second end of the valve member,
the extension at the second end of the valve member is fabricated of a fluid permeable material for transference of the fluid from the fluid source through the inlet port, the permeable extension of the valve member and the outflow bore of the valve seat member to the downstream processing tool when the valve device is in an open position, and
the fluid source comprises at least one of (i) a fluid storage and dispensing vessel holding a storage medium for said fluid, and (ii) a fluid storage and dispensing vessel having a pressure actuated fluid flow control assembly interiorly disposed therein.

In another aspect, the invention relates to a fluid supply apparatus including a higher pressure fluid source and a permeable valve assembly for controlling gas delivery from the higher pressure fluid source to a lower pressure processing tool, said permeable valve assembly comprising a valve poppet movingly engageable with a valve seating member, and a fluid permeable insert positioned between the valve poppet and the valve seating member, wherein:
the fluid permeable insert is isolated from flowing fluid when the valve poppet is sealingly engaged with the valve seating member thereby preventing fluid flow through the valve assembly,
the fluid permeable insert provides a diffusional path for transfer of all flowing fluid from the higher pressure fluid source when the valve poppet is not sealingly engaged with the valve seating member,
the fluid permeable insert comprises a vapor/gas-permeable and liquid-impermeable material and can be inserted into the sealable and engageable surface of either the valve seat member or the valve poppet, and
the higher pressure fluid source comprises at least one of (i) a fluid storage and dispensing vessel holding a storage medium for said fluid, and (ii) a fluid storage and dispensing vessel having a pressure actuated fluid flow control assembly interiorly disposed therein.

In another aspect, the invention relates to a fluid supply apparatus, comprising:

a fluid source including at least one of (i) a fluid storage and dispensing vessel holding a storage medium for said fluid, and (ii) a fluid storage and dispensing vessel having a pressure actuated fluid flow control assembly interiorly disposed therein; and
a flow control valve adapted to control flow of fluid dispensed from said vessel(s), said flow control valve including (i) a valve poppet movingly engageable with a valve seating member, and (ii) fluid permeable material that is unexposed to flowing fluid when the valve poppet is in a closed position thereby preventing fluid flow through the valve assembly and providing a diffusional path for transfer of flowing fluid when the valve poppet is in an open position.

A still further aspect of the invention relates to a fluid supply apparatus, comprising:

a fluid source including at least one of (i) a fluid storage and dispensing vessel holding a storage medium for said fluid, and (ii) a fluid storage and dispensing vessel having a pressure actuated fluid flow control assembly interiorly disposed therein; and a flow control valve adapted to control flow of fluid dispensed from said vessel(s), said flow control valve including (i) a valve poppet movingly engageable with a valve seating member, and (ii) fluid permeable material that is unexposed to flowing fluid when the valve poppet is in a closed position thereby preventing fluid flow through the valve assembly and providing a diffusional path for transfer of flowing fluid when the valve poppet is in an open position.

Another aspect of the invention relates to a method of dispensing fluid, including providing a fluid supply apparatus as described hereinabove, and actuating the valve to the open position to effect dispensing from said fluid source.

In yet another aspect, the invention relates to a method of manufacturing a product in a production process utilizing a fluid, including dispensing the fluid from a fluid supply apparatus of the type described hereinabove An additional aspect of the invention relates to a method of producing a fluid source for use in dispensing fluid, such method including providing a fluid supply apparatus as variously described hereinabove, and filling the fluid storage and dispensing vessel with fluid.

The above and other aspects and advantages of the invention will become apparent from the following more detailed description, taken in conjunction with the accompanying drawings.

DETAILED DESCRIPTION OF THE INVENTION AND THE PREFERRED EMBODIMENT THEREOF

The disclosures of the following U.S. Patents and U.S. patent applications are hereby incorporated herein by reference, in their entireties, for all purposes: U.S. patent application Ser. No. 10/314,728; U.S. Patent Application Publication 2004/0206241; and U.S. Pat. Nos. 5,704,965; 5,704,967; 5,707,424; 5,518,528; 6,101,816; and 6,089,027.

In accordance with the present invention, controlled discharge of a pressurized fluid, such as a pressurized toxic gas from a fluid source is accomplished by diffusing the gas through a permeable section of a valve assembly device.

Figure 1:
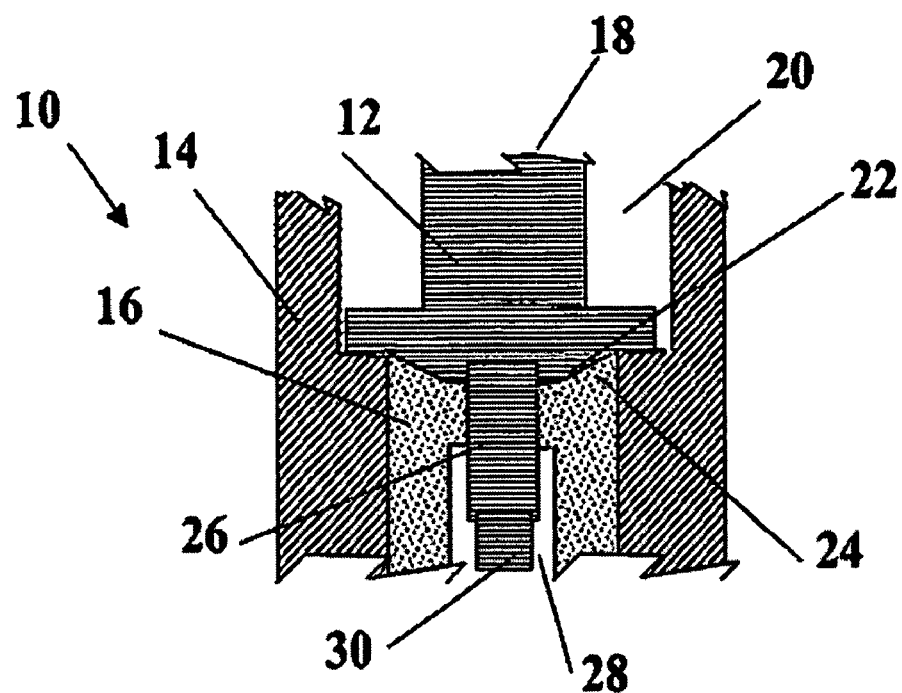
FIG. 1 is a side elevational view of a permeable valve device of the present invention showing the permeable valve seat and valve poppet in a closed and sealing position.
Figure 2:
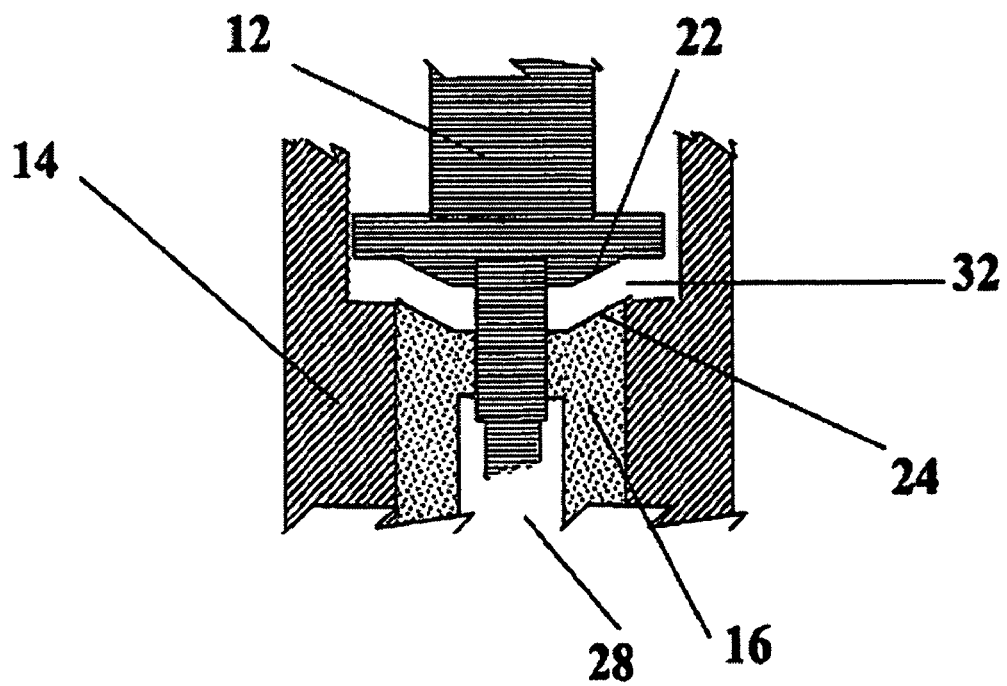
FIG. 2 is a side elevational view of a permeable valve device of the present invention showing the permeable valve seat and valve poppet in an open and discharging mode.
Figure 3:
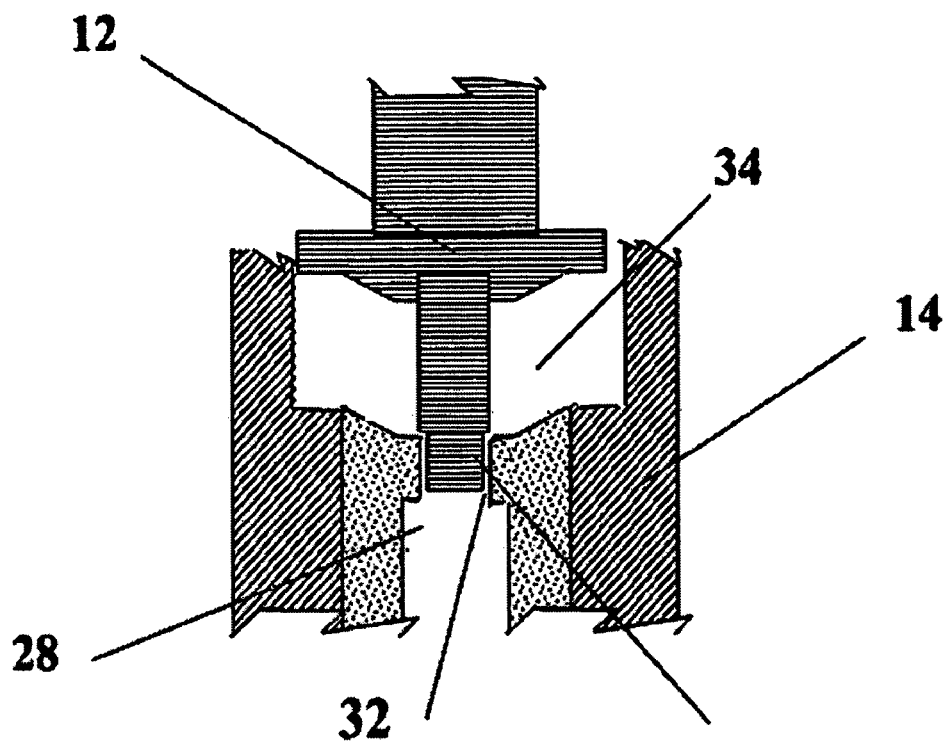
FIG. 3 is a side elevational view of a permeable valve device of the present invention showing the permeable valve seat and valve poppet in a filling mode.

Referring to FIGS. 1-3, a valve assembly device in accordance with the present invention is generally depicted at 10 having a valve member 12 (poppet) and a valve seat member 14. Enclosed within the valve seat member is an insert 16 fabricated of a permeable material for diffusing gas therethrough. Although not shown, a source of fluid under pressure is preferably disposed immediately upstream from the valve assembly. Downstream of the valve assembly is a processing tool (not shown) that requires fluid at low pressure. The valve assembly device of the present invention controls passage of fluid from the source to the downstream tool.

Valve member 12 comprises a first end extension 18 which in FIGS. 1-3 extends axially outward and is of sufficient length to extend into the inlet port 20, the line that is attached to the fluid source for transference of the fluid to the valve assembly. The first end extension 18 has a smaller cross-sectional dimension relative to the dimension of the inlet port to provide sufficient space for movement of the discharging fluid from the fluid source through the inlet port. On the second end of the valve member is a seating or abutting surface 22 that engages with a corresponding reversely configured surface 24 of the permeable valve seat member 14. The second end of the valve member further comprises an extension 26 that extends into an outflow bore 28 that extends into and traverses through the permeable valve seat member.

FIG. 1 illustrates one embodiment of the permeable valve assembly of the present invention wherein the valve poppet member 12 is fully engaged with the permeable valve seat member 14 to form a sealing junction to prevent fluid flow from the fluid source to the processing tool. The contacting surface 24 of the permeable material insert 16 is completely isolated from the fluid source by the valve member surface 22 and extension 26 both of which are fabricated of an impermeable material FIG. 2 illustrates the permeable valve assembly in the operating position for flow of fluids from the fluid source through the inlet port, around the head of the valve member and through the permeable insert 16 of the valve seat member 14. Preferably, the extension 26 is sized to fit within the outflow bore so that all dispensed fluid passes through the permeable material. An o-ring may be further included to provide a movable seal to ensure transference of fluids through only the permeable insert 16.

FIG. 3 shows the present embodiment in the fill mode. To facilitate quick refilling of the fluid source, the valve member extension 26 is fully extended away from the valve seat member 14. Preferably, the extension 26 is structurally configured to include a smaller dimensional end 30 that provides a space or gap 32 between the inner surface of the outflow bore 28 and the narrowed end 30 of valve member extension 26 to provide for fluid flow and transference of fluid to the fluid source.

Figure 4:
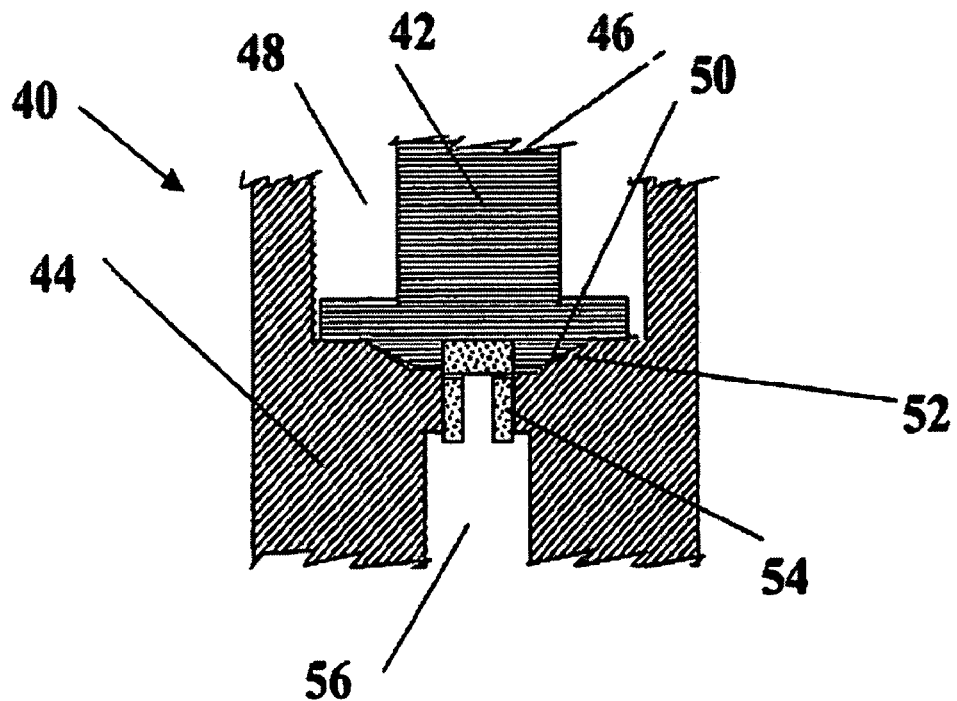
FIG. 4 is a side elevational view of another embodiment of the present invention showing the valve seat and valve poppet having a permeable extension in a closed and sealing position.

FIG. 4 shows another embodiment of the present invention where the permeable valve assembly 40 comprises a permeable valve member 42 and a valve seat member 44. Permeable valve member 42 comprises a first end extension 46 which in FIGS. 4-7 extends axially outward and is of sufficient length to extend into the inlet port 48, the line that is attached to the fluid source for transference of the fluid to the valve assembly. The first end extension 46 has a smaller cross-sectional dimension relative to the dimension of the inlet port to provide sufficient space for movement of the discharging fluid from the fluid source through the inlet port. On the second end of the valve member is a seating or abutting surface 50 that engages with a corresponding reversely configured surface 52 of the valve seat member 44. The second end of the valve member further comprises a permeable extension 54 that extends into an outflow bore 56 that traverses through the valve seat member.

Figure 5:
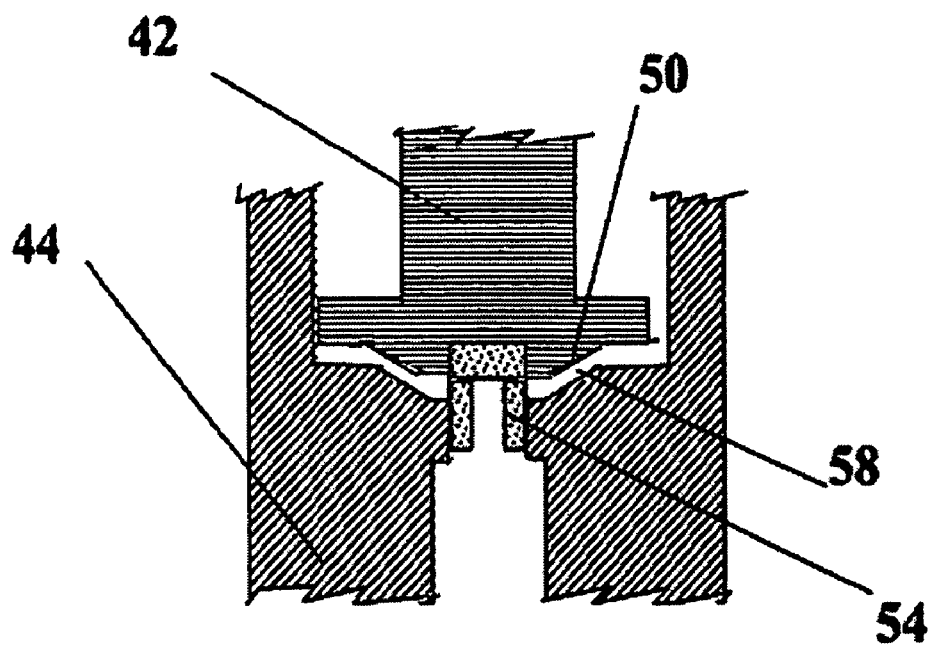
FIGS. 5 and 6 show the valve assembly of FIG. 4 in different stages of discharge through the permeable extension of the valve poppet.
Figure 6:
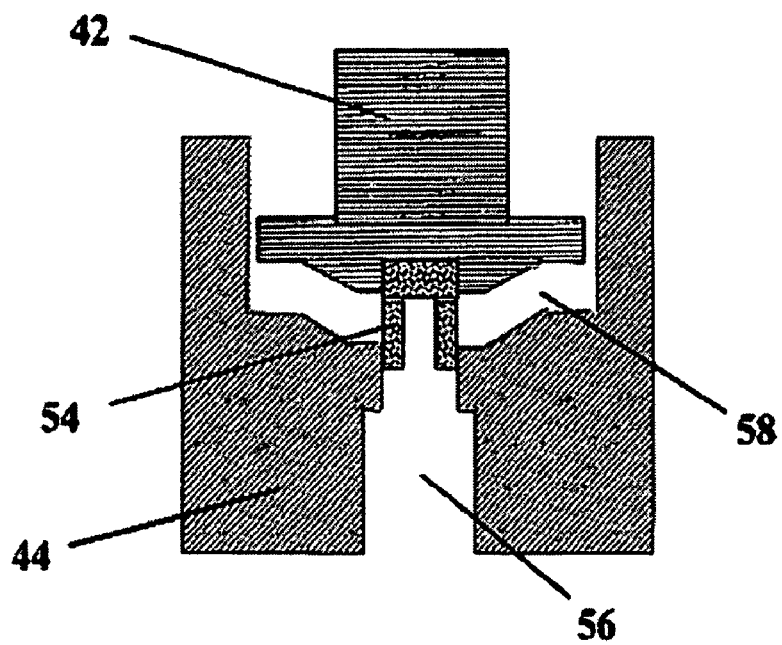

In this embodiment, the permeable extension 54, attached to the valve member (poppet), provides a diffusible surface for controlled transference of gases from the upstream fluid source to the downstream processing tool. In FIG. 4, the valve member surface, and the permeable extension 54 are fully engaged with the valve seat member 44 and outflow bore 56 to form a sealing junction to prevent fluid flow from the fluid source to the processing tool. The permeable extension 54, is completely isolated from the fluid source by the sealing junction of valve member surface 50 and valve seat surface 52 both of which are fabricated of an impermeable material FIGS. 5 and 6 illustrate the permeable valve assembly in the operating position for low and higher flow of fluids from the fluid source through the inlet port, through a channel 58 around the head of the valve member and through the permeable wall of permeable extension 54 to the outflow bore 56. Preferably, the permeable extension 54 is sized to fit within the outflow bore so that all dispensed fluid passes through the permeable material to the downstream processing tool.

Figure 7:
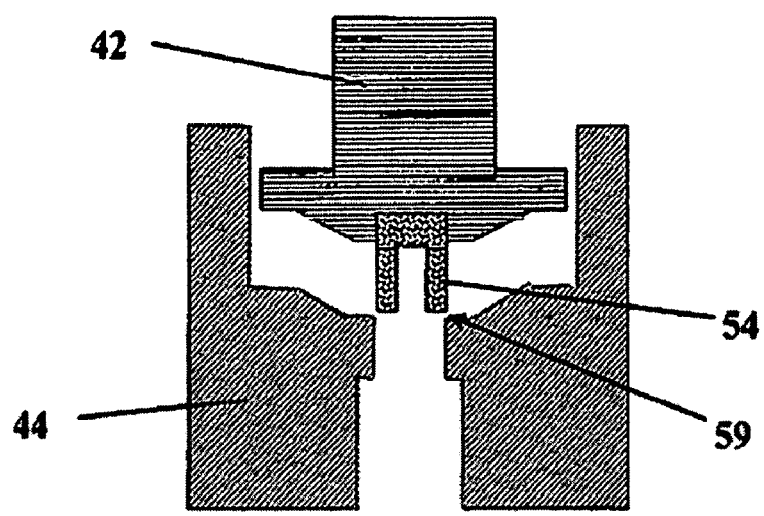
FIG. 7 shows the valve assembly of FIG. 4 fully extended in the fill mode for easy and quick filling.

FIG. 7 shows this embodiment in the fill mode. To facilitate quick refilling of the fluid source, the permeable valve member extension 54 is fully extended away from the valve seat member 44. In the fill mode, the extended member 54 exposes a groove 59 that facilitates easy filing of the fluid source by bypassing the permeable extension 54 and entering directly into inlet port.

The permeable material fabricated into the valve assembly causes a slight drag that controls the high flow of the fluid that is limited by the pressure and temperature of the fluid and also the permeability of the permeable material. This diffusing factor reduces the potential that pressure spikes will result downstream. Generally any permeable material that is vapor/gas permeable and preferably liquid impermeable may be used and formed of a wide variety of potentially useful materials, including, for example, polypropylene, polyvinylidene fluoride, polytetrafluoroethylene, polyfluoroacetate, and silicone. One preferred useful material comprises polyvinylidene fluoride.

Permeation of gases through polymers is a well-know phenomenon and tabulated permeability values of a wide variety of materials potentially suitable for the permeation insert or permeable valve extension may be employed to design a gas delivery system in accordance with the present invention.

In general, the permeation of a gas through a polymeric film is determined by the following equation $R = P \times SA$ wherein R=permeation rate, P is the permeation constant for a given polymeric material, at standard temperature and pressure, and SA is the surface area of the permeation surface. Thus, it is possible to control the rate of permeation by a number of techniques, including: changing the temperature, which will in turn change the vapor pressure and diffusion constant across the permeable wall; changing the thickness of the permeable wall; and mechanically changing the exposed surface area in the diffusion system by moving the valve member.

Figure 8:
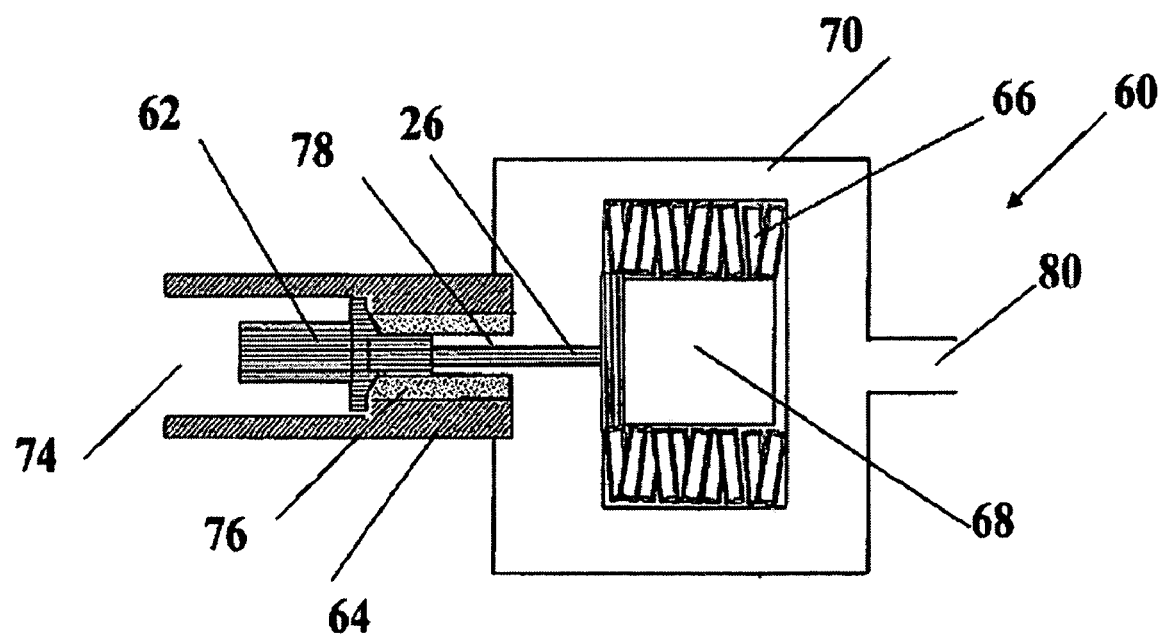
FIGS. 8 and 9 show the permeable valve assembly incorporated into a regulator using a bellows system for expansion and contraction that translates movingly engageable movement to the valve assembly.
Figure 9:
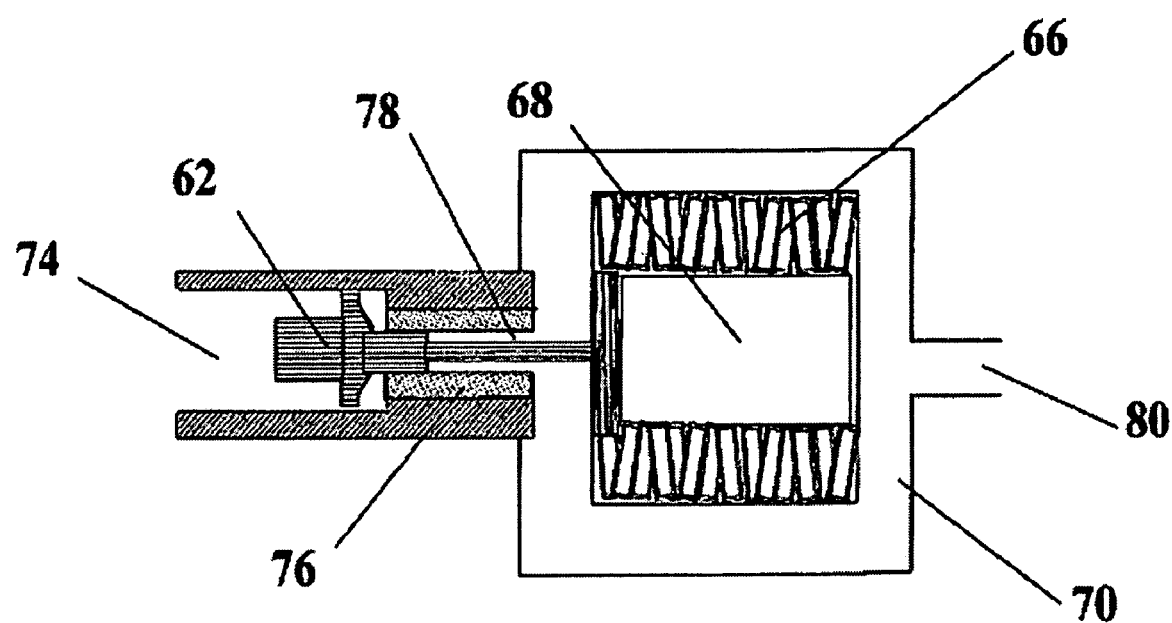

The valve assembly of the present invention is applicable for inclusion is various systems, e.g., as shown in FIGS. 8 and 9. The permeable valve assembly can be included in a regulator 60 that include a bellow system 66 and an interior chamber 68 that is directly attached to the small diameter extension 26. A pressure differential facilitates movement of the valve member into or away from the permeable valve seat member 64. In the alternative, the surrounding chamber is directly attached to the valve seat member which is then move into or away from the valve member.

If the pressure in the chamber 70 is greater than the pre-selected pressure within the internal volume 68, a diaphragm system attached to the valve member 62 will contract and the valve member will be urged towards the valve seat member 64 to prevent fluid flow through the permeable material of the valve assembly. Basically the diaphragm 66 is compressed forcing the valve member 62 to move towards the valve seat to sealingly engage therewith. Once the fluid pressure in chamber 70 subsides, the diaphragm system can expand, as shown in FIG. 9, with the concomitant unseating of the valve member to establish fluid flow through the permeable insert in the valve seat member to the outflow port 78, through chamber 70 and on to the processing tool at 80.

Figure 10:
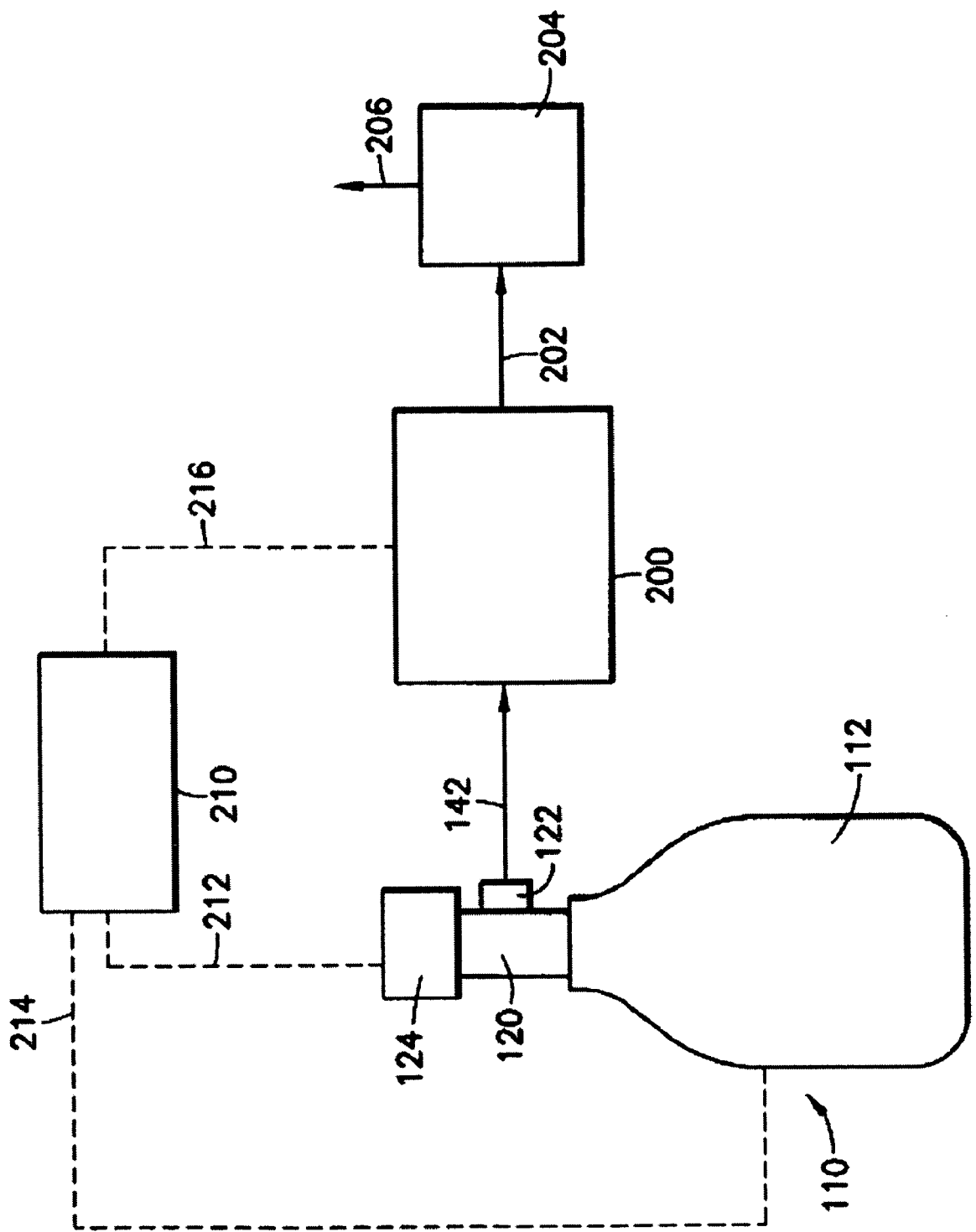
FIG. 10 is a schematic representation of a semiconductor product manufacturing facility, including a fluid storage and dispensing apparatus and flow circuitry, incorporating a permeable valve assembly of the invention, in which the flow circuitry interconnects the fluid storage and dispensing apparatus with a semiconductor manufacturing tool.

FIG. 10 is a schematic representation of a semiconductor product manufacturing facility, including a fluid storage and dispensing apparatus and flow circuitry, incorporating a permeable valve assembly of the invention, in which the flow circuitry interconnects the fluid storage and dispensing apparatus with a semiconductor manufacturing tool.

The fluid storage and dispensing apparatus 110 includes a generally cylindrical vessel 112 adapted to hold fluid, e.g., liquid or gas, at a predetermined pressure. The valve head assembly comprises a flow control valve 120 with an actuator 124 being arranged to selectively actuate the valve and effect discharge of gas from the vessel in line 142.

The valve actuator 124 is controlled by central processor unit 210, which may comprise a computer or microprocessor control apparatus, coupled in controlling relationship with the valve actuator 124 by means of signal transmission line 212.

The central processor unit 210 may be constructed and arranged to actuate the valve according to a cycle time program. Alternatively, the central processor unit 210 may monitor a process condition in the semiconductor manufacturing facility 200 by means of process condition signal transmission line 216 which conveys a signal indicative of a given process condition to the central processor unit, causing the unit to responsively actuate the valve actuator 124 to a corresponding extent, to modulate the gas flow in line 142 in proportion to the needs of the semiconductor manufacturing facility.

The central processor unit 210 may also receive a signal correlative of the temperature of the vessel in signal transmission line 214, which may be joined to a thermal sensor or embedded thermocouple associated with vessel 112, to compensate the flow of fluid in line 142 in relation to the temperature of vessel 112.

The semiconductor manufacturing facility 200 may comprise any suitable arrangement of semiconductor process equipment for the production of semiconductor materials or devices, or products containing such materials or devices.

For example, the semiconductor manufacturing facility 200 may comprise an ion implantation system, lithotracks, chemical vapor deposition reactor and associated reagent supply and vaporization equipment (including liquid delivery equipment, bubblers, etc.), etch unit, cleaning apparatus, etc.

In one particular embodiment of the present invention, a liquid hydride fluid is maintained under pressure in vessel 112 and gas derived therefrom is selectively dispensed in line 142 to the semiconductor manufacturing facility 200 comprising an ion implantation chamber. The dispensed gas, together with suitable carrier and/or diluent gas(es), is subjected to ionization, and the resulting ion species are implanted in a substrate, e.g., a semiconductor device precursor structure or subassembly.

The semiconductor manufacturing facility 200 subsequent to use of the dispensed gas, discharges an effluent gas stream in line 202 which may be flowed to an effluent gas treatment system 204, for treatment and discharge of final purified effluent in line 206.

The flow control valve 120 in the fluid storage and dispensing apparatus 110 of FIG. 10 may be a permeable valve assembly as described hereinabove, e.g., of any of the types variously shown in FIGS. 1-7, and the vessel 112 may be adapted in the manner disclosed in U.S. Pat. No. 5,518,528 to hold a physical adsorbent medium having fluid sorptively retained thereon and desorbable from the adsorbent medium under dispensing conditions, or the vessel 112 may be adapted in the manner disclosed in U.S. Patent Application Publication 2004/0206241 to hold a fluid in a reversibly reacted state in a reactive liquid having opposing Lewis basicity or acidity, or otherwise to hold the fluid in a liquid storage medium in the vessel from which the fluid can be liberated under dispensing conditions. Thus, the vessels described herein can be any container for materials. Preferably, the vessel comprise a subatmospheric vessel such as those described in U.S. Pat. Nos. 5,518,528; 5,704,965; 5,704,967; 5,935,305; 6,406,519; 6,204,180; 5,837,027; 6,743,278; 6,089,027; 6,101,816; 6,343,476; 6,660,063; 6,592,653; 6,132,492; 5,851,270; 5,916,245; 5,761,910; 6,083,298; 6,592,653; and 5,707,424, hereby incorporated herein by reference, in their respective entireties. Preferred vessels include SDS® and VAC® delivery vessels (ATMI, Inc.).

As used herein, the term "storage medium" refers to a material disposed in the fluid storage and dispensing vessel, with which the fluid is interactive so that the fluid can be stored on, in or by such material or its interaction product, and from which the fluid is disengageable for dispensing of fluid from the vessel.

In such respect, the "storage medium" may include a sorbent medium such as a solvent, liquid, semi-solid, or other material having capability as a storage medium. For example, the fluid storage medium may be a reversible reactive liquid medium, e.g., an ionic liquid medium, capable of reactive uptake of fluid in a first step, and reactive release of previously taken up fluid in a second step, wherein the first and second steps are reverse reactions in relation to one another, and define a reversible reaction scheme. According to another embodiment, the vessel uses a liquid absorbent, such as those disclosed in U.S. Patent Publication No. 20040206241, hereby incorporated by reference.

Alternatively, the vessel 112 may comprise an interiorly disposed pressure actuated fluid flow control assembly as more fully described in U.S. Pat. Nos. 6,101,816 and 6,089,027, wherein such pressure actuated fluid flow control assembly includes a permeable valve assembly in accordance with the present invention, e.g., a permeable valve assembly in a regulator as shown and described with reference to FIGS. 8 and 9 herein.

As a further variation, the fluid supply with which the permeable valve assembly is used may be of both types, i.e., a physical adsorbent-containing vessel adapted to sorptively retain fluid on the physical adsorbent for fluid desorption and dispensing from the vessel under dispensing conditions, in combination with an interior regulator-equipped fluid storage and dispensing vessel, with the respective vessels manifolded or otherwise arranged with flow circuitry to supply fluid to a fluid use facility.

Alternatively, the vessel may be a gas generating vessel that generates gas to be delivered on demand using an electric current, chemical reaction or any other means.

As a still further alternative the vessel is an ampoule useful for storage and delivery of low vapor pressure materials (e.g. liquids and solids) such as those described in U.S. Pat. Nos. 6,868,869; 6,740,586; U.S. patent application Ser. Nos. 10/201,518; 10/858,509; 10/625,179; 10/028,743; U.S. Provisional Patent Application Ser. No. 60/662,515; and U.S. Provisional Patent Application Ser. No. 60/662,396, hereby incorporated herein by reference, in their respective entireties.

As a still further variation of the system shown in FIG. 10, the flow circuitry can include a permeable valve assembly in line 142, or the FIG. 10 system can otherwise be constructed and arranged to incorporate a permeable valve assembly, to enhance the safety and flow control capability of such system.

The permeable valve assembly of the present invention can for example be used in any system that reduces highly-pressurized gas in a cylinder or process line to a lower, useable level as the gas passes through another piece of equipment that uses a valve poppet. The system may further include a bellow system or springs that react to a pressure differential to open and close the valve poppet.

I claim:

1. A fluid supply apparatus including a fluid source and a permeable fluid valve assembly for delivery of a fluid from the fluid source to a downstream processing tool, wherein the permeable valve assembly comprises:

an inlet port for communication with an outlet of a fluid source for flowing fluid from the fluid source; and a permeable valve device positioned downstream from the fluid source comprising a valve member and a permeable valve seat member, wherein:

the valve device is adapted for movement between a sealing position that blocks fluid flow through the inlet port and an open position that permits fluid flow through the inlet port and valve device, the valve member has a first end and a second end and the first end is positioned in the inlet port, the valve seat member has an abutting first end having an outflow bore therethrough for acceptance of an extension attached to at least a section of the second end of the valve member, the abutting first end of the valve seat member comprises a member that is conformingly configured for engagement with the second end of the valve member and fabricated of a fluid permeable material for transference of the fluid from the fluid source through the inlet port and the permeable material of the valve seat member to the downstream processing tool when the valve device is in the open position, and the fluid source comprises at least one of (i) a fluid storage and dispensing vessel holding a storage medium for said fluid, and (ii) a fluid storage and dispensing vessel having a pressure actuated fluid flow control assembly interiorly disposed therein.

2. The fluid supply apparatus according to claim 1, wherein the fluid source comprises a fluid storage and dispensing vessel holding a storage medium for said fluid.

3. The fluid supply apparatus according to claim 2, wherein the fluid storage and dispensing vessel includes a valve head comprising said permeable fluid valve assembly.

4. The fluid supply apparatus according to claim 1, wherein the fluid source comprises a fluid storage and dispensing vessel having a pressure actuated fluid flow control assembly interiorly disposed therein.

5. The fluid supply apparatus according to claim 4, wherein the pressure actuated fluid flow control assembly comprises the permeable valve assembly in a regulator.

6. The fluid supply apparatus according to claim 1, wherein the valve member is an elongated structure comprising a first end extension having a reduced cross-section relative to the inlet port to provide sufficient area for passing fluid through the inlet port around the valve member to pass through the permeable material of the valve seat member.

7. The fluid supply apparatus according to claim 6, wherein the valve seat member further comprises an outflow bore through the fluid permeable material member for receiving an extension element attached to the second end of the valve member, wherein the extension element sealingly fits within the bore to allow movement in the bore but substantially reduces fluid passage through the bore from the fluid source.

8. The fluid supply apparatus according to claim 7, further comprising a chamber surrounding a diaphragm that defines an interior volume isolated from pressure conditions upstream of the valve element and engaged with the extension element of the valve member to control the movement of the valve member in a manner that retains the valve member in the sealing position until a pressure differential between the interior volume of the diaphragm and the interior of the chamber moves the valve member to the open position.

9. The fluid supply apparatus according to claim 8, further comprising resilient means positioned near the first end of the valve member and holding the valve member in the sealing position.

10. The fluid supply apparatus according to claim 7, wherein the extension element has a reduced cross-section tip to provide sufficient space in the outflow bore for filling of the fluid source when the valve member is moved to the fully open position.

11. The fluid supply apparatus according to claim 1, wherein the fluid permeable material member surrounds the outflow bore that traverses through the valve seating member.

12. The fluid supply apparatus according to claim 1, wherein the fluid source comprises a semiconductor manufacturing fluid.

13. The fluid supply apparatus according to claim 1, coupled in fluid supplying relationship to a semiconductor manufacturing tool.

14. The fluid supply apparatus according to claim 13, wherein the semiconductor manufacturing tool comprises an ion implant tool.

15. A semiconductor manufacturing facility including a fluid supply apparatus according to claim 1, and a semiconductor manufacturing tool.

16. The semiconductor manufacturing facility according to claim 15, further enclosing flow circuitry interconnecting the fluid source and the semiconductor manufacturing tool.

17. The semiconductor manufacturing facility according to claim 15, wherein the semiconductor manufacturing tool comprises an ion implant tool.

18. A fluid supply apparatus including a higher pressure fluid source and a permeable valve assembly for controlling gas delivery from the higher pressure fluid source to a lower pressure processing tool, said permeable valve assembly comprising:

an inlet port for connection to an outlet of the fluid source for flowing fluid from the fluid source;

a valve poppet movingly engageable with a valve seating member, wherein the valve poppet has a first end and a second end and the first end is positioned in the inlet port; and a fluid permeable member positioned between the second end of the valve poppet and the valve seating member, wherein:

the fluid permeable member is isolated from flowing fluid when the valve poppet is sealingly engaged with the valve seating member thereby preventing fluid flow through the valve assembly, the fluid permeable member provides a diffusional path for transfer of all flowing fluid from the higher pressure fluid source when the valve poppet is not sealingly engaged with the valve seating member, the fluid permeable member can be inserted into the sealable and engageable surface of either the valve seat member or the second end of the valve poppet, and the higher pressure fluid source comprises at least one of (i) a fluid storage and dispensing vessel holding a storage medium for said fluid, and (ii) a fluid storage and dispensing vessel having a pressure actuated fluid flow control assembly interiorly disposed therein.

19. A fluid supply apparatus including a fluid source and a permeable fluid valve assembly for delivery of a fluid from the fluid source to a downstream processing tool, said permeable fluid valve assembly comprising:

an inlet port for communication with an outlet of a fluid source for flowing fluid from the fluid source; and a valve device positioned downstream from the fluid source comprising a valve member and a valve seat member, wherein:

the valve device is adapted for movement between a sealing position that blocks fluid flow through the inlet port and an open position that permits fluid flow through the inlet port and valve device, the valve member has a first end and a second end, wherein the first end is positioned in the inlet port, the valve seat member has an abutting first end having a bore therethrough for acceptance of an extension attached to at least a section of the second end of the valve member, the extension at the second end of the valve member is fabricated of a fluid permeable material for transference of the fluid from the fluid source through the inlet port, the permeable extension of the valve member and the outflow bore of the valve seat member to the downstream processing tool when the valve device is in an open position, and the fluid source comprises at least one of (i) a fluid storage and dispensing vessel holding a storage medium for said fluid, and (ii) a fluid storage and dispensing vessel having a pressure actuated fluid flow control assembly interiorly disposed therein.

20. The fluid supply apparatus according to claim 19, wherein the fluid source comprises a fluid storage and dispensing vessel holding a storage medium for said fluid.

21. The fluid supply apparatus according to claim 19, wherein the fluid source comprises a fluid storage and dispensing vessel having a pressure actuated fluid flow control assembly interiorly disposed therein.

22. The fluid supply apparatus according to claim 19, wherein the valve member includes an elongated structure comprising a first end extension having a reduced cross-section relative to the inlet port to provide sufficient area for passing fluid through the inlet port around the valve member to pass through the permeable material of the valve seat member.

23. The fluid supply apparatus according to claim 22, wherein the valve seat member further comprises a bore through the member for receiving an extension element attached to the second end of the valve member, wherein the extension element sealingly fits within the bore to allow movement in the bore but substantially reduces fluid passage through the bore from the fluid source.

24. The fluid supply apparatus according to claim 23, further comprising a chamber surrounding a diaphragm that defines an interior volume isolated from pressure conditions upstream of the valve element and engaged with the extension element of the valve member to control the movement of the valve member in a manner that retains the valve member in the sealing position until a pressure differential between the interior volume of the diaphragm and the interior of the chamber moves the valve member to the open position.

25. The fluid supply apparatus according to claim 24, further comprising resilient means positioned near the first end of the valve member and holding the valve member in the sealing position.

26. The fluid supply apparatus according to claim 23, wherein the extension element has a reduced cross-section tip to provide sufficient space in the outlet bore for filling of the fluid source when the valve member is moved to the fully open position.

27. A fluid supply apparatus including a higher pressure fluid source and a permeable valve assembly for controlling gas delivery from the higher pressure fluid source to a lower pressure processing tool, said permeable valve assembly comprising a valve poppet movingly engageable with a valve seating member, and a fluid permeable member positioned between the valve poppet and the valve seating member,
wherein:
the fluid permeable member is isolated from flowing fluid when the valve poppet is sealingly engaged with the valve seating member thereby preventing fluid flow through the valve assembly,
the fluid permeable member provides a diffusional path for transfer of all flowing fluid from the higher pressure fluid source when the valve poppet is not sealingly engaged with the valve seating member,
the fluid permeable member comprises a vapor/gas-permeable and liquid-impermeable material and can be inserted into the sealable and engageable surface of either the valve seat member or the valve poppet, and
the higher pressure fluid source comprises a fluid storage and dispensing vessel.

28. A fluid supply apparatus, comprising:
a fluid source including a fluid storage and dispensing vessel; and
a flow control valve adapted to control flow of fluid dispensed from said vessel(s), said flow control valve including (i) a valve poppet movingly engageable with a valve seating member, and (ii) fluid permeable material that is unexposed to flowing fluid when the valve poppet is in a closed position thereby preventing fluid flow through the valve assembly and providing a diffusional path for transfer of flowing fluid when the valve poppet is in an open position;
wherein the fluid permeable material contacts both the valve poppet and the valve seating member when the valve poppet is in said closed position.

29. The fluid supply apparatus according to claim 28, wherein the fluid storage and dispensing vessel has a pressure actuated fluid flow control assembly comprises the flow control valve.

30. A method of dispensing fluid, comprising providing a fluid supply apparatus including:
a fluid source comprising a fluid storage and dispensing vessel; and
a flow control valve adapted to control flow of fluid dispensed from said vessel(s), said flow control valve including (i) a valve poppet movingly engageable with a valve seating member, and (ii) fluid permeable material that is unexposed to flowing fluid when the valve poppet is in a closed position thereby preventing fluid flow through the valve assembly and providing a diffusional path for transfer of flowing fluid when the valve poppet is in an oven position;
wherein the fluid permeable material contacts both the valve poppet and the valve seating member when the valve poppet is in said closed position.

31. A method of manufacturing a product in a production process utilizing a fluid, comprising dispensing said fluid from a fluid supply apparatus including:
a fluid source comprising a fluid storage and dispensing vessel; and
a flow control valve adapted to control flow of fluid dispensed from said vessel(s), said flow control valve including (i) a valve poppet movingly engageable with a valve seating member, and (ii) fluid permeable material that is unexposed to flowing fluid when the valve poppet is in a closed position thereby preventing fluid flow through the valve assembly and providing a diffusional path for transfer of flowing fluid when the valve poppet is in an open position;
wherein the fluid permeable material contacts both the valve poppet and the valve seating member when the valve poppet is in said closed position.

32. The method of claim 31, wherein said product is a semiconductor device.

33. A method of producing a fluid source for use in dispensing fluid, said method comprising
providing a fluid supply apparatus including:
a fluid source comprising a fluid storage and dispensing vessel; and
a flow control valve adapted to control flow of fluid dispensed from said vessel(s), said flow control valve including (i) a valve poppet movingly engageable with a valve seating member, and (ii) fluid permeable material that is unexposed to flowing fluid when the valve poppet is in a closed position thereby preventing fluid flow through the valve assembly and providing a diffusional path for transfer of flowing fluid when the valve poppet is in an open position;

wherein the fluid permeable material contacts both the valve poppet and the valve seating member when the valve poppet is in said closed position.

34. The fluid supply apparatus of claim 28, wherein the fluid permeable material is constructed and arranged in a conformation, wherein said conformation is selected from among:

a first conformation in which the fluid permeable material has a bore opening with which a portion of the valve poppet is movingly engageable; and a second conformation in which the valve seating member has a bore opening therein, and the fluid permeable material is coupled to the valve poppet and movingly engageable with the bore opening of the valve seating member.

35. The fluid supply apparatus of claim 28, wherein the fluid permeable material has a bore opening with which a portion of the valve poppet is movingly engageable.

36. The fluid supply apparatus of claim 28, wherein the fluid permeable material is coupled to the valve poppet and movingly engageable with the bore opening of the valve seating member.

37. The fluid supply apparatus of claim 27, wherein the fluid storage and dispensing vessel (1) holds a storage medium for said fluid, and/or (2) has a pressure actuated fluid flow control assembly interiorly disposed therein.

38. The fluid supply apparatus of claim 28, wherein the fluid storage and dispensing vessel (1) holds a storage medium for said fluid, and/or (2) has a pressure actuated fluid flow control assembly interiorly disposed therein.

39. The method of claim 31, wherein the fluid storage and dispensing vessel (1) holds a storage medium for said fluid, and/or (2) has a pressure actuated fluid flow control assembly interiorly disposed therein.

40. The method of claim 30, wherein the fluid storage and dispensing vessel (1) holds a storage medium for said fluid, and/or (2) has a pressure actuated fluid flow control assembly interiorly disposed therein; further comprising actuating the valve to said open position to effect dispensing from said fluid source.

41. The method of claim 33, wherein the fluid storage and dispensing vessel (1) holds a storage medium for said fluid, and/or (2) has a pressure actuated fluid flow control assembly interiorly disposed therein; further comprising filling said fluid storage and dispensing vessel with fluid.

42. A fluid supply apparatus according to claim 28, wherein the fluid storage and dispensing vessel comprises a vessel adapted to hold a source material from which fluid is generated.

* * * * *

UNITED STATES PATENT AND TRADEMARK OFFICE
CERTIFICATE OF CORRECTION

| | | |
|---|---|---|
| PATENT NO. | : 7,370,661 B2 | Page 1 of 1 |
| APPLICATION NO. | : 11/214165 | |
| DATED | : May 13, 2008 | |
| INVENTOR(S) | : Glenn M. Tom | |

It is certified that error appears in the above-identified patent and that said Letters Patent is hereby corrected as shown below:

Column 14, line 36 (claim 30), "an oven position" should be -- an open position --.

Signed and Sealed this

Twelfth Day of August, 2008

JON W. DUDAS
*Director of the United States Patent and Trademark Office*